ment of the component parts of a sulky-plow as
UNITED STATES PATENT OFFICE.

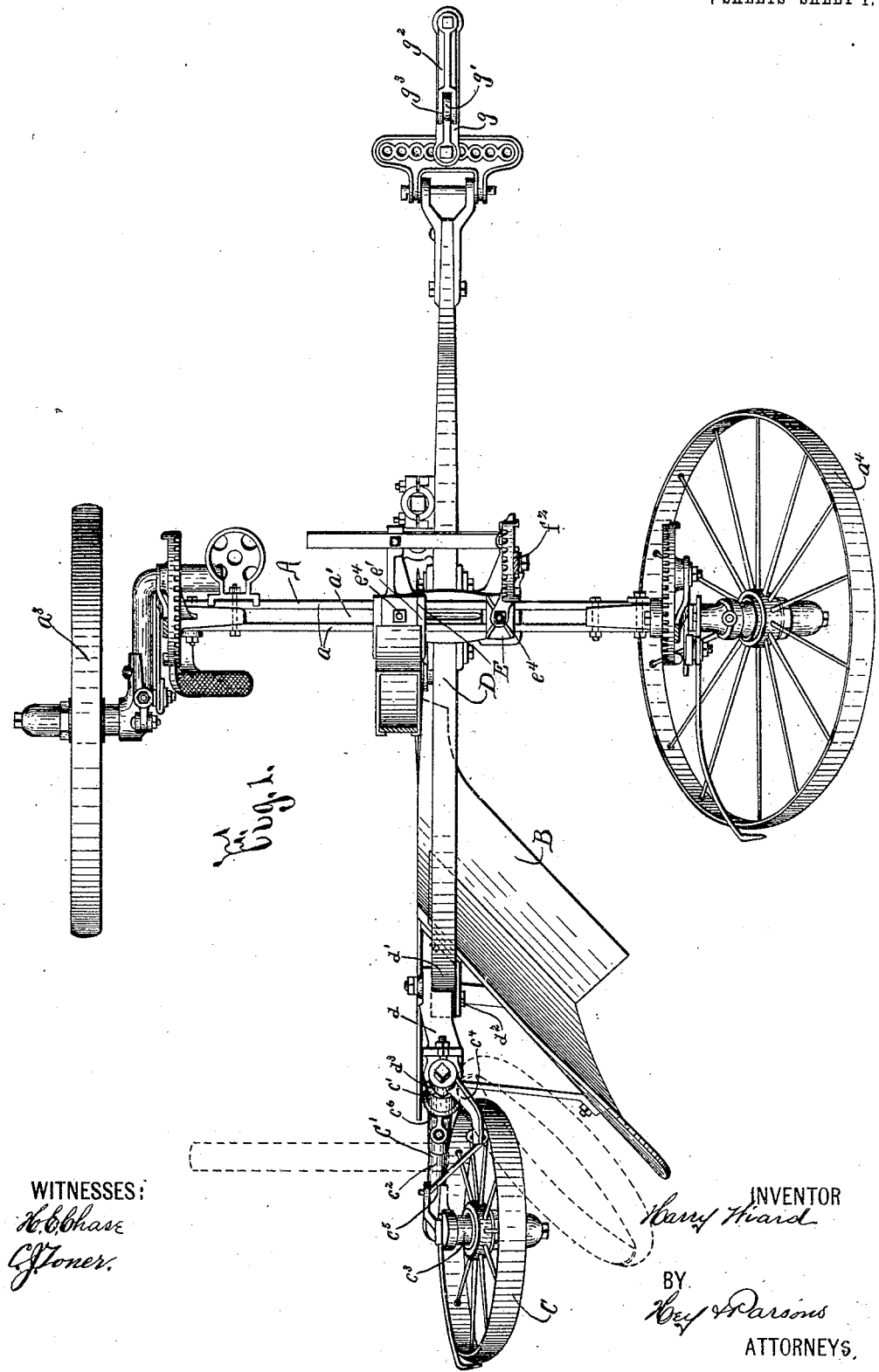

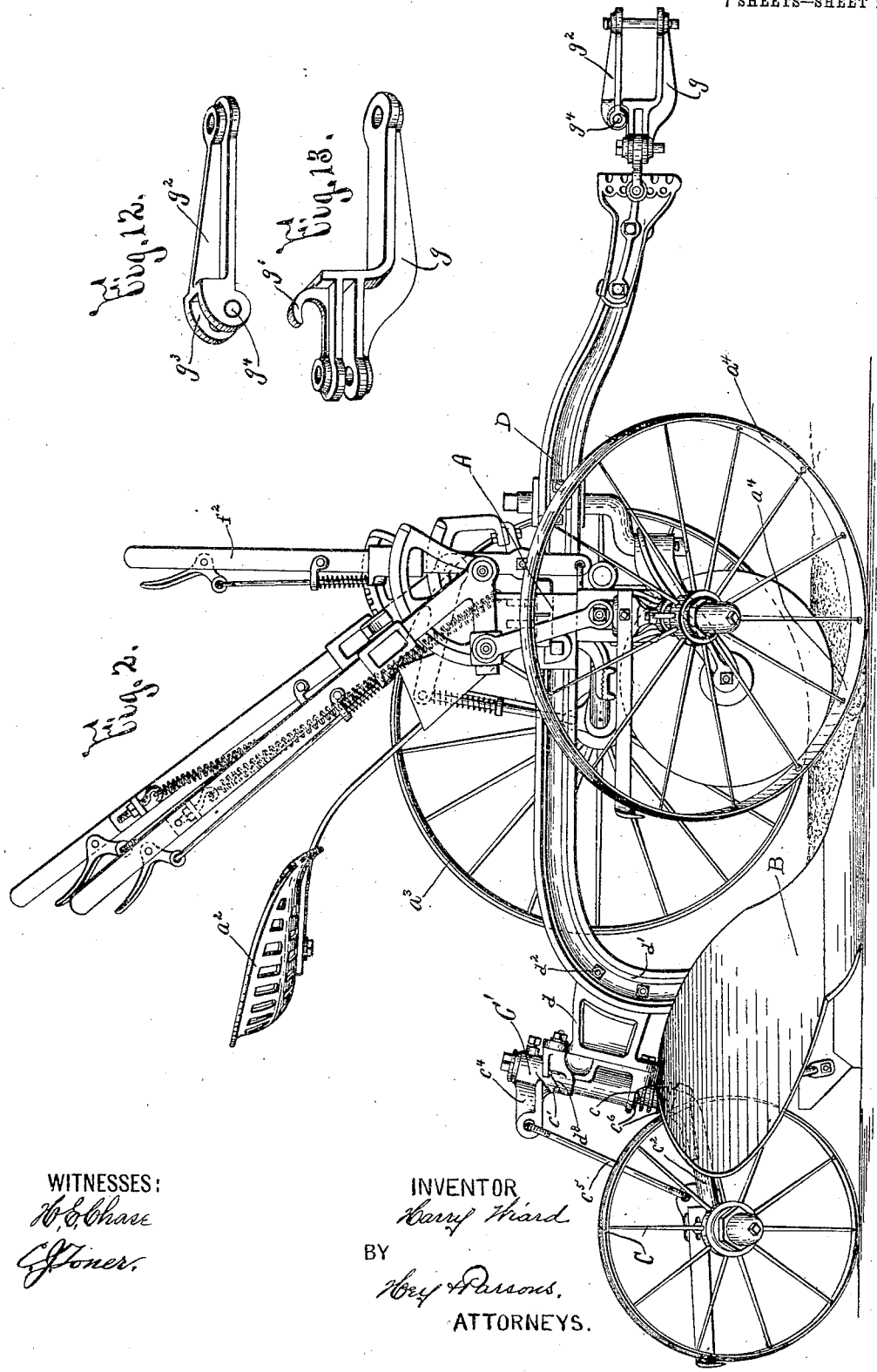

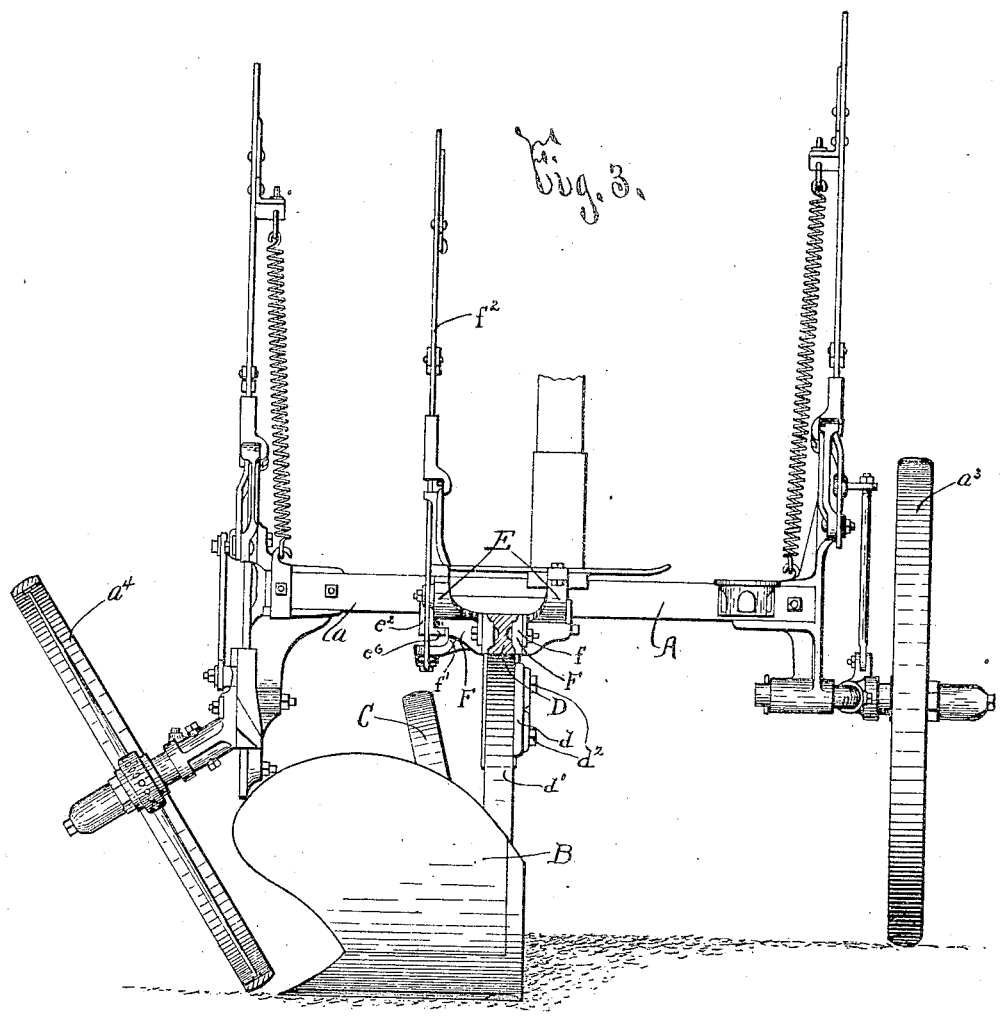

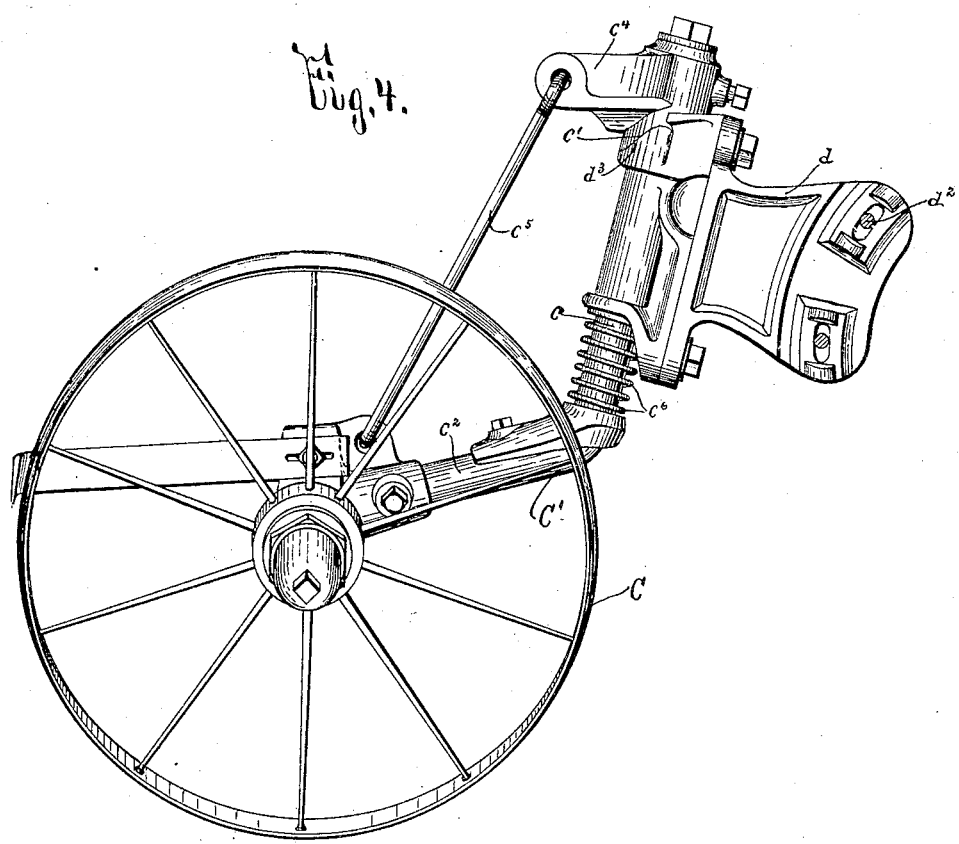

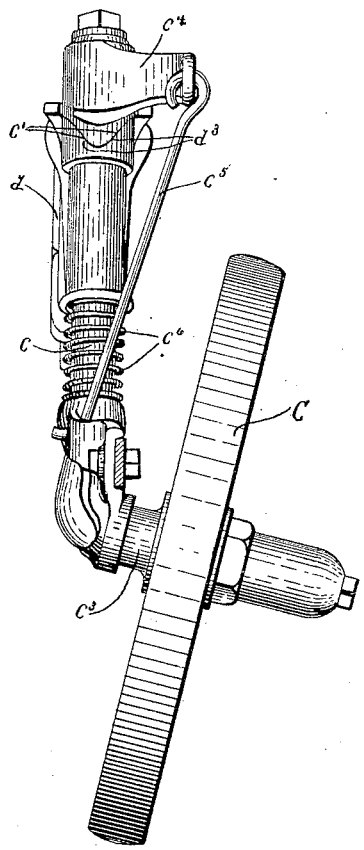

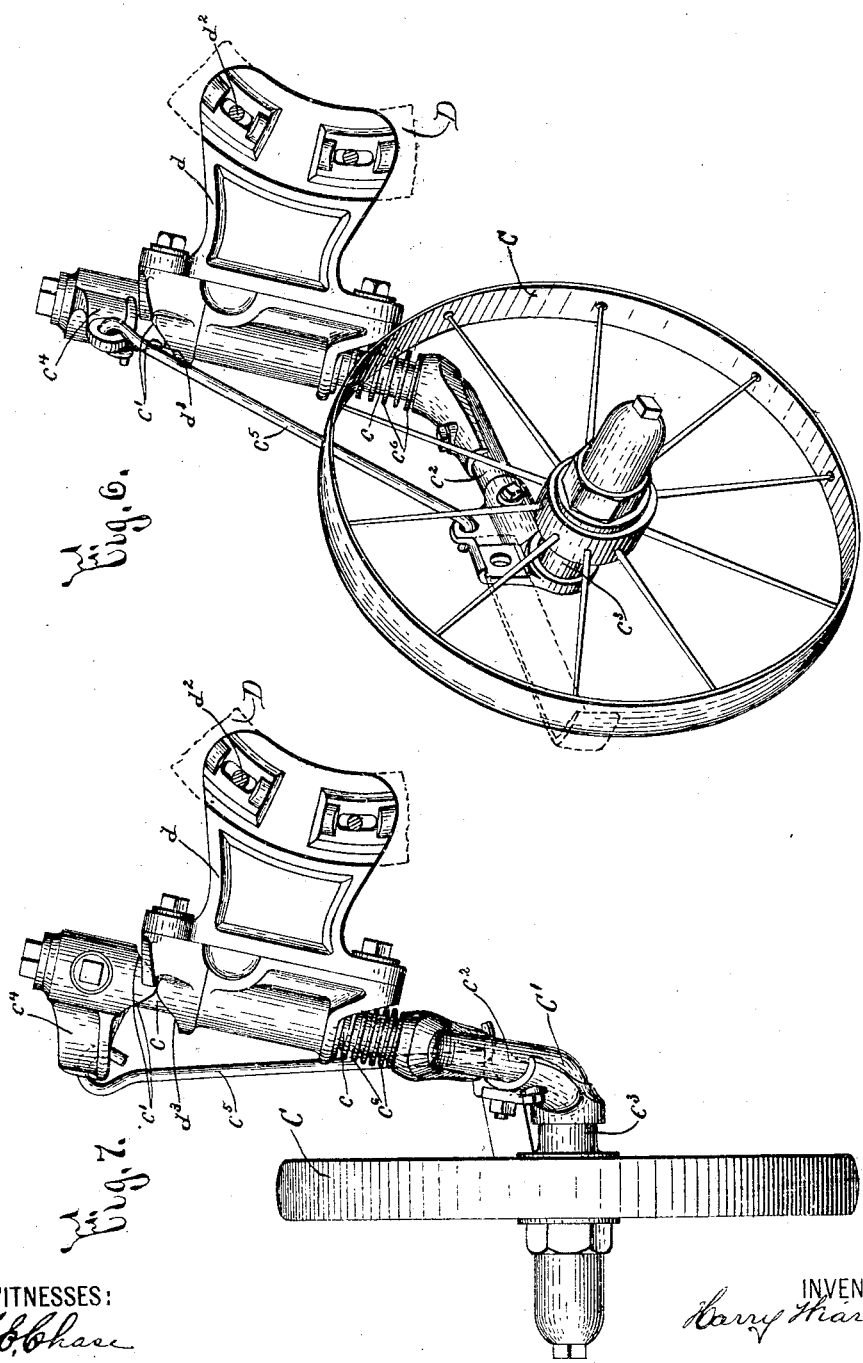

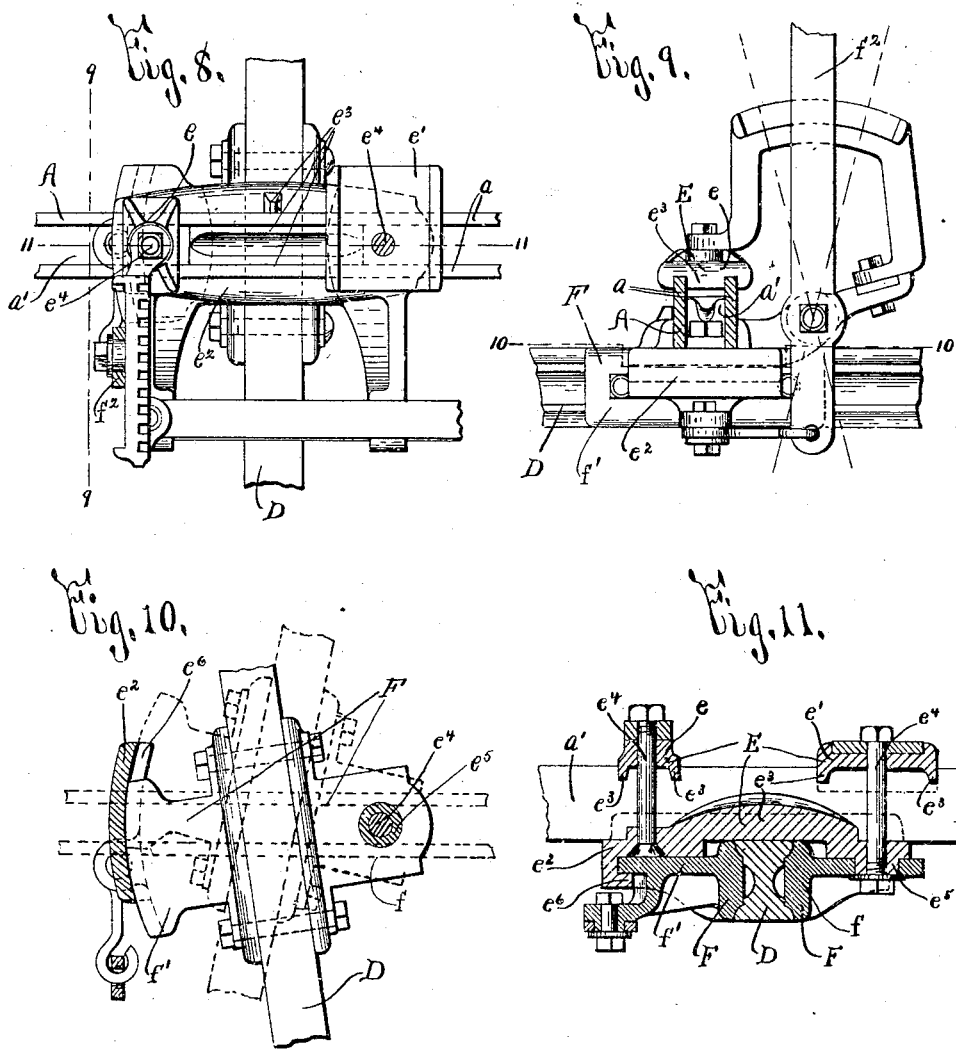

HARRY WIARD, OF SYRACUSE, NEW YORK.

SULKY-PLOW.

946,928.  Specification of Letters Patent.  Patented Jan. 18, 1910.

Application filed March 13, 1902. Serial No. 97,994.

*To all whom it may concern:*

Be it known that I, HARRY WIARD, of Syracuse, in the county of Onondaga and State of New York, have invented a certain new and useful Sulky-Plow, of which the following is a specification.

My invention has for its object the production of a sulky-plow, which is particularly simple in construction and efficient in operation; and to this end, it consists in the combination, construction and arrangement of the component parts of a sulky-plow as hereinafter fully described and pointed out in the claims.

In describing this invention, reference is had to the accompanying drawings, in which like letters indicate corresponding parts in all the views.

Figures 1 and 2 are, respectively, top plan and side elevation of my sulky-plow, parts thereof being omitted in Fig. 1. Fig. 3 is a front elevation of said sulky-plow, portions thereof being broken away and in section. Figs. 4 and 5 are, respectively, side and rear elevations of the rear furrow-wheel, the support for the rear furrow-wheel, and the arm on the plow-beam to which said support is pivoted, the furrow-wheel being shown in both views as in its position assumed in the preceding figures, and a portion of the scraper for the furrow-wheel being omitted in Fig. 5. Figs. 6 and 7 are elevations of the parts illustrated in Figs. 4 and 5, the furrow-wheel being shown in positions assumed during the turning of the sulky-plow. Fig. 8 is a top plan view of a portion of the wheeled frame, the plow-beam, the supporting members for the plow-beam, and contiguous parts of the sulky-plow. Figs. 9, 10 and 11 are sectional views taken, respectively, on lines 9—9, Fig. 8; 10—10, Fig. 9; and 11—11, Fig. 8. Figs. 12 and 13 are isometric views of the separable sections of the clevis.

My sulky-plow comprises, essentially, a wheeled-frame A, a plow B, a rear furrow-wheel C, and a beam D. The frame A is of any desirable form, size and construction and is provided with a transverse connecting member $a$ formed with a lengthwise opening $a'$ extending through its upper and lower faces. Said frame is also provided with a seat $a^2$, a land wheel $a^3$, a front furrow-wheel $a^4$, and suitable means, unnecessary to describe herein, for raising and lowering said wheels $a^3$ $a^4$. The plow B is also of any desirable form, size and construction.

The rear furrow-wheel C is mounted on a support C' having its front end portion $c$ inclined upwardly and forwardly out of a vertical plane and journaled in a rearwardly extending arm $d$ provided on the rear end of the beam, its intermediate portion $c^2$ inclined downwardly out of horizontal plane, and rearwardly, and its rear end portion $c^3$ inclined downwardly and laterally and forming a substantially horizontal spindle for the rear furrow-wheel C. Said support C' is also formed with downwardly converging or under bevel engaging faces $c'$. The faces $c'$ instead of being formed directly on the support C are provided on a rearwardly extended arm $c^4$ fixed to the front end $c$ thereof and connected by a link $c^5$ to substantially the point of union of the intermediate portion $c^2$ and the rear end $c^3$ of the support C', but it is obvious that the faces $c'$ may be formed directly upon said front end $c$. A suitable spring $c^6$ usually encircles the front end $c$ of the support C' and holds said support C' in its normal position, as seen in Figs. 1 to 5, inclusive. The arm $d$ is mounted on a portion $d'$ of the beam D extended downwardly and rearwardly, is adjustable substantially vertically on said portion of the beam, and is held in its adjusted position by any desirable clamping means $d^2$. Said arm is provided with a normally fixed cam having downwardly converging or standing bevel faces $d^3$ for engaging the faces $c'$ and moving the furrow-wheel support C' in a direction endwise of the upwardly inclined axis of the front end portion $c$ thereof, against the action of the spring $c^6$ during the turning of the sulky.

The member C', when of the construction described, supports the rear furrow-wheel in the desired position and at the required inclination, and the faces $c'$ $d^3$ and the spring $c^6$ hold said support and furrow-wheel from displacement. When the sulky-plow is being turned to the left-hand looking forwardly, Fig. 1 in passing a corner, the rear furrow-wheel C swings, relatively to the beam, to the left looking forwardly toward its position assumed in Fig. 7 and indicated by dotted lines in Fig. 1, thus facilitating turning of the sulky-plow, and this movement of the furrow-wheel takes place automatically and without requiring control or regulation by the operator. Moreover, during said swinging movement, the rear furrow-wheel is slightly raised relatively to the beam D and the plow B by the cam provided with the faces $d^3$ and, consequently, elevation of the plow B is prevented. If the sulky-plow is backed, instead of being turned, as described, the rear furrow-wheel swings automatically to its position shown by dotted lines in Fig. 1 in close proximity to the plow B and braces against said plow, thus reducing to a minimum the liability of injury to the rear furrow-wheel during the backing of the sulky-plow.

The beam D is secured to the plow B by any suitable means, is arranged beneath the connecting bar $a$ of the frame A, and is connected to said bar by supporting members E F, which permit the beam D to swing laterally independently of the frame A. The supporting member E is normally fixed to the bar $a$, is adjustable laterally on said bar, and preferably consists of separable upper sections $e$ $e'$ and a lower section $e^2$ engaged, respectively, with the upper and lower faces of the connecting bar and having their opposing surfaces provided with shoulders $e^3$ projecting into the opening $a'$, and clamping members $e^4$ for securing the sections $e$ $e'$ $e^2$ together. The section $e^2$ is usually formed at one end with a depending pivotal projection $e^5$ and at its opposite end with a shoulder $e^6$ arranged concentric with said projection. The supporting member F consists of separable sections $f$ $f'$, respectively engaged with opposite side faces of the beam D and having their opposing surfaces provided with shoulders projecting into grooves in the sides of the beam. The outer end of one of the sections is pivoted upon the projection $e^5$ and the outer end of the other section is movable forwardly and rearwardly along the shoulder $e^6$ and is connected to suitable means, as a lever $f^2$, for varying the position of the supporting member F and holding the same in its adjusted position.

The beam D is generally provided with a clevis composed of a lower section $g$ having its upper face provided with a rearwardly extending substantially hook-shaped shoulder $g'$, and an upper section $g^2$ provided with a slot $g^3$ extending through its upper and lower faces for receiving the substantially hook-shaped shoulder and a transverse pin $g^4$ for detachably engaging said shoulder $g'$.

My sulky-plow will now be readily understood upon reference to the foregoing description and the accompanying drawing, and it will be particularly noted that more or less change may be made in the construction and arrangement of the component parts thereof without departing from the spirit of my invention.

Having thus fully described my invention, what I claim as new and desire to secure by Letters Patent, is:—

1. In a sulky-plow, the combination of a beam and a plow, of a furrow-wheel, and a support for the furrow-wheel having its front end journaled in an upright bearing, means for automatically moving said support endwise in the bearing to change the position of the furrow-wheel relatively to the beam during the turning of the sulky-plow, and a spring for opposing the endwise movement of said support in the bearing, substantially as and for the purpose specified.

2. In a sulky-plow, the combination with a beam and a plow; of a furrow-wheel, a support for the furrow-wheel movable on an upwardly inclined axis and having a substantially horizontal bearing part for the furrow-wheel projecting laterally from said axis, a cam normally fixed relatively to the beam for raising the support during the turning of the sulky-plow, and a spring for holding the support in its normal position, substantially as and for the purpose set forth.

3. In a sulky-plow, the combination with a beam and a plow; of a furrow-wheel, a support for the furrow-wheel having its front end inclined upwardly and forwardly, its intermediate portion inclined downwardly and rearwardly from the lower part of the front end, and its rear end extended laterally and downwardly from the rear part of the intermediate portion and forming a bearing for the furrow-wheel, a cam normally fixed relatively to the beam for engaging the front end of the support and raising said support relatively to the beam during the turning of the sulky-plow, and a spring encircling the front end of the support for holding the support in its normal position, substantially as and for the purpose described.

4. In a sulky-plow, the combination with a beam and a plow; of the furrow-wheel, a support for the furrow-wheel, said support being movable on an upwardly extending axis and being provided with downwardly underbevel faces, and means provided with standing bevel faces for engaging the former faces and thereby holding the support in its normal position and raising the support and furrow-wheel relatively to the adjacent portion of the sulky plow during the turning of the sulky plow, substantially as and for the purpose specified.

5. In a sulky-plow, the combination with a beam and a plow; of a furrow-wheel, a support for the furrow-wheel having its front end inclined upwardly and forwardly and provided with downwardly converging engaging faces, its intermediate portion inclined downwardly and rearwardly from the lower part of the front end, and its rear end extended laterally and downwardly from the rear part of the intermediate portion and forming a bearing for the furrow-wheel, a cam normally fixed relatively to the beam and provided with downwardly converging faces for engaging the former faces and thereby holding the support in its normal position and raising the support during the turning of the sulky-plow, and a spring for holding said faces in engagement, substantially as and for the purpose set forth.

6. In a sulky-plow, the combination with a plow, and a beam formed with a portion extended downwardly and rearwardly and having a rearwardly extending arm adjustable substantially vertically on said portion of the beam; of a furrow-wheel, and a support for the furrow-wheel journaled in the arm on an upwardly inclined axis and having a substantially horizontal bearing part for the furrow-wheel projecting laterally from said axis, substantially as and for the purpose specified.

7. In a sulky-plow, the combination of a wheeled frame provided with a transverse connecting bar, a plow, and a beam hanging from the connecting bar and secured to the plow, said beam being connected to the bar of the frame and slidable laterally independently thereof, substantially as and for the purpose set forth.

8. In a sulky-plow, the combination of a wheeled frame, a plow, a supporting member having one end pivoted to the frame and its other end movable forwardly and rearwarly, and a beam secured to the plow and connected to the supporting member, substantially as and for the purpose specified.

9. In a sulky-plow, the combination of a wheeled frame, a plow, a supporting member fixed to the frame and movable laterally, said supporting member being provided with a shoulder, a second supporting member having one end pivoted to the first supporting member and its other end movable forwardly and rearwardly along said shoulder, and a beam secured to the plow and connected to the second supporting member, substantially as and for the purpose set forth.

10. In a sulky-plow, the combination of a wheeled frame provided with a transverse connecting bar formed with a lengthwise opening extending through its upper and lower faces, a supporting member consisting of separable sections engaged respectively with the upper and lower faces of the connecting bar and having their opposing surfaces provided with shoulders projecting into said opening, and clamping members for securing the sections together, a plow, and a beam connected to the supporting member and secured to the plow, substantially as and for the purpose described.

11. In a sulky-plow, the combination of a wheeled frame, a plow, a supporting member fixed to the frame, said supporting member being provided with a shoulder, a beam secured to the plow and having grooves in its sides and a supporting member consisting of separable sections engaged with opposite side faces of the beam and having their opposing surfaces provided with shoulders projecting into the grooves in the sides of the beam, one of the sections having its outer end pivoted to the first supporting member and the other section having its outer end movable forwardly and rearwardly along said shoulder, and clamping members for securing the sections of the second supporting member together, substantially as and for the purpose specified.

In testimony whereof, I have hereunto signed my name in the presence of two attesting witnesses, at Syracuse, in the county of Onondaga, in the State of New York, this 5th day of March, 1902.

HARRY WIARD.

Witnesses:
   D. LAVINE,
   S. DAVIS.